Jan. 16, 1923.

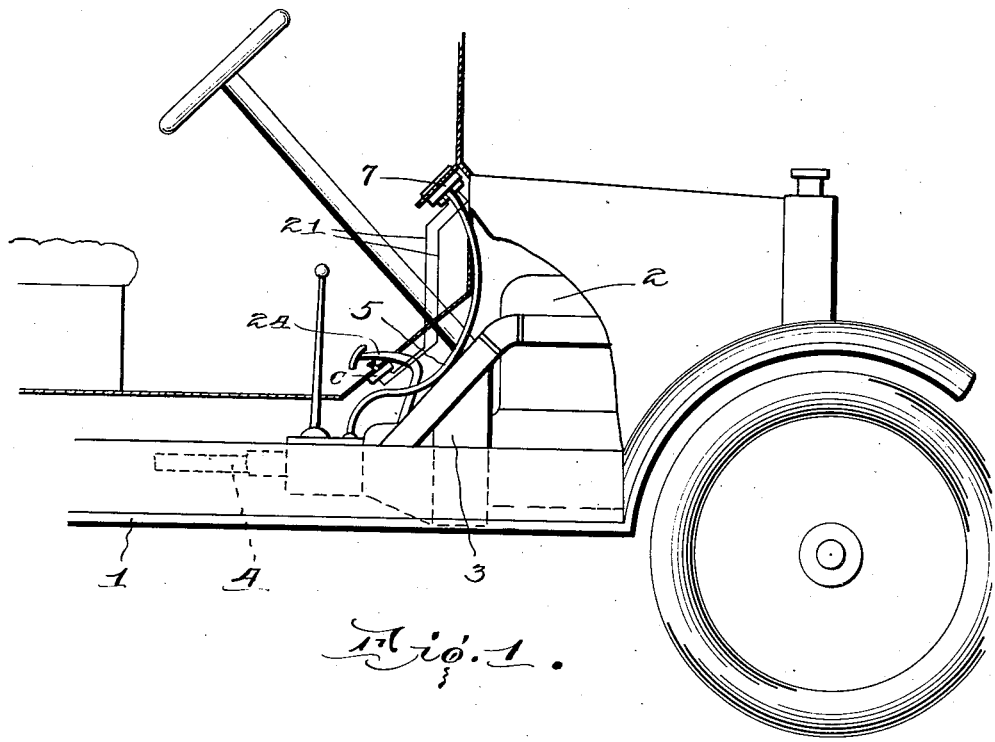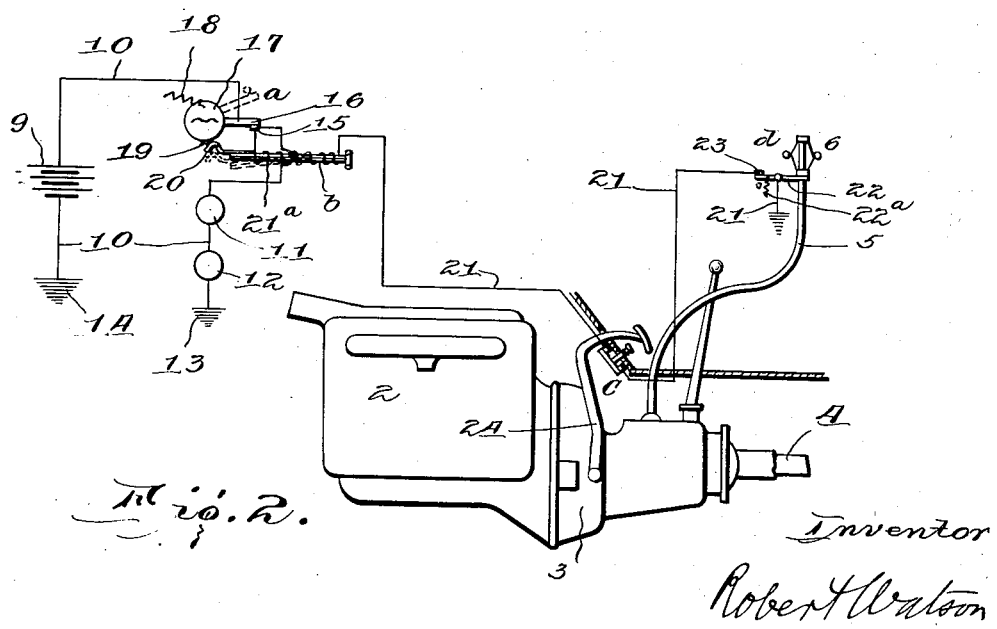

R. WATSON.

MEANS FOR CONTROLLING THE IGNITION CIRCUITS OF AUTOMOBILE ENGINES.
FILED AUG. 18, 1921.

Inventor
Robert Watson

Patented Jan. 16, 1923.

1,442,313

UNITED STATES PATENT OFFICE.

ROBERT WATSON, OF SILVER SPRING, MARYLAND.

MEANS FOR CONTROLLING THE IGNITION CIRCUITS OF AUTOMOBILE ENGINES.

Application filed August 18, 1921. Serial No. 493,424.

*To all whom it may concern:*

Be it known that I, ROBERT WATSON, a citizen of the United States, residing at Silver Spring, in the county of Montgomery and State of Maryland, have invented certain new and useful Improvements in Means for Controlling the Ignition Circuits of Automobile Engines, of which the following is a specification.
This invention relates to means for automatically controlling the ignition circuits of internal combustion engines upon motor vehicles so as to stop the engine in case the operator permits it to run idly for a needless length of time. Where a battery ignition system is used, the invention also provides for automatically opening the primary circuit of the system while the engine is stopped, in case the operator inadvertently leaves this circuit closed at the key controlled switch usually provided on the dashboard of the vehicle.

In my co-pending applications, Serial No. 424,735 filed Nov. 17, 1920, and Serial No. 427,730, filed Dec. 2, 1920, I have shown means for stopping idling automobile engines, and the present invention embodies modifications of the apparatus there shown, the leading feature of the present invention being the employment of one or more thermostats, operated by current flowing in a circuit independent of the ignition circuit, as a means for causing the stoppage of the engine. The invention also embodies means whereby the operator, while seated in the vehicle, may conveniently interrupt the circuit of the thermostat, to prevent stoppage of the engine when the vehicle is stopped by traffic congestion on the roadway, and whereby said circuit will be restored before the vehicle again starts.

In the accompanying drawing,

Fig. 1 is a side view of the forward end of a motor vehicle, partly broken away, with my improvements thereon;

Fig. 2 is a diagrammatic view illustrating the invention as applied to a battery ignition system;

Figure 3:
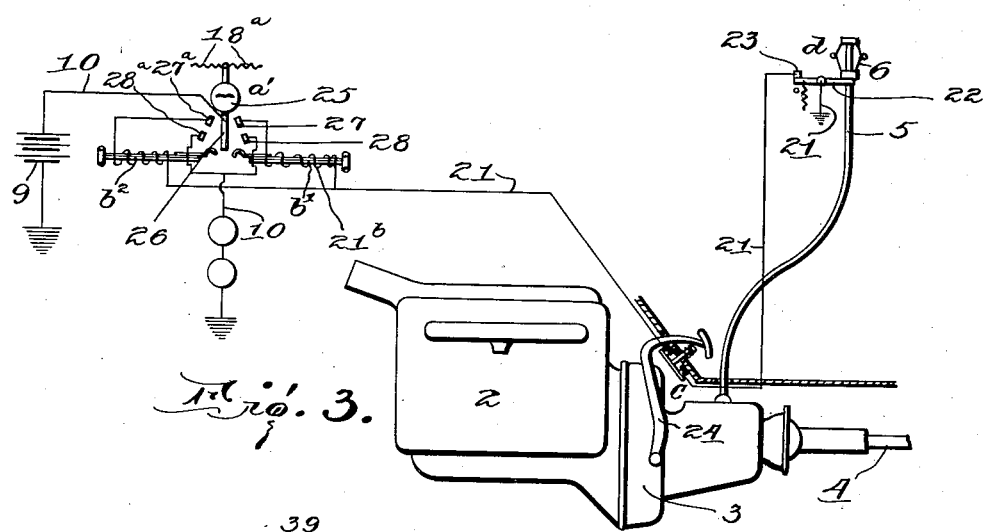
Fig. 3 is a diagrammatic view similar to that in Fig. 2, but showing two thermostats which may be employed alternately as a switch controlling means.

Referring to the drawing, 1 indicates a motor vehicle having an internal combustion engine 2, and the usual clutch, contained in a casing 3, for connecting the engine to the propellor shaft 4, which operates the driving axles of the vehicle through differential gearing in the usual manner. The shaft 4, which turns only when the vehicle is in motion, drives a flexible shaft 5, connected to a centrifugal governor 6, which may be the governor of a speedometer contained in a suitable casing 7 and utilized as a switch controlling means.

Referring to Fig. 2 of the drawing, 9 indicates the battery which is carried on the vehicle, and 10 indicates the primary circuit of an ignition system, which circuit extends from one side of the battery through a switch *a*, which may be placed on the dashboard of the vehicle and controlled by a key, thence to coil 11, circuit breaker and distributor 12, and thence to the other side of the battery through the ground connections indicated at 13 and 14. The secondary circuit, including the connections to the spark plugs, is not shown. The switch *a* comprises a fixed contact 15 adapted to be engaged by a switch arm 16, which is attached to a disk 17, and the arm is normally held out of engagement with the fixed contact by a spring 18. The disk is provided with a projection 19 on its periphery, adapted to be engaged by a detent 20, connected to the movable end of a thermostat bar *b*, when the switch is in its closed or "on" position and the thermostat bar is at normal temperature, said detent serving to hold the switch in the "on" position, in which it is shown in full lines in the drawing. When the temperature of the thermostat is increased to a predetermined degree, however, the thermostat will move the detent out of engagement with the projection on the disk, and the spring 18 will throw the switch to the "off" position indicated in dotted lines, thus opening the ignition circuit.

The thermostat has a heating element, indicated as a coil 21ª, included in a circuit 21, which is independent of the ignition circuit and which is connected to the battery through the switch a, when the latter is in the "on" position, and disconnected from the battery when the switch is in the "off" position. This thermostat circuit, as shown, extends from the contact 15, through the coil 21ª, thence through two normally closed switches c and d, and thence to ground. When the switch a is closed, if the motor is running, a pulsating current will flow through the ignition circuit, owing to the action of the circuit breaker; but if the motor is stopped, direct current may or may not flow through said circuit, depending upon whether the contacts on the circuit breaker happen to be engaged or disengaged at the time the motor stops. In the thermostat circuit, however, a continuous current will always flow while the switch a is closed, whether the motor be running or stopped, providing the switches c and d are also closed. The heating of the thermostat by this continuous current will cause the thermostat to trip the switch in a predetermined time, say two minutes, after the closure of the switch, and the opening of the switch will interrupt the thermostat circuit as well as the ignition circuit.

The switch d is controlled by a part on the vehicle which occupies one position when the vehicle is stopped and another position while the vehicle is in motion, in this instance, by a governor which is driven from the propeller shaft, and which moves only when the vehicle is in motion. As shown, the switch d comprises a centrally pivoted switch lever 22, which is normally pressed against the stationary contact 23 by the governor, and which is moved out of engagement with said contact by a spring 22ª as soon as the vehicle moves and the governor lifts away from the switch lever. With this arrangement, the switch d opens as soon as the vehicle is started, remains open while the vehicle is running, and closes automatically when the vehicle stops. Hence, no current can flow through the heating coil of the thermostat while the vehicle is in operation; but current will commence to flow as soon as the vehicle is stopped, and if the operator does not then stop the engine by opening the key switch a, or hold the switch c open, the thermostat will heat and trip the switch a. This will stop the motor and also open the thermostat circuit so that the thermostat will cool and be ready for locking the key switch when it is next moved to the "on" position.

The manually controlled switch c, which is shown as a normally closed push button switch, is arranged so that it may be conveniently held in open position by the driver of the vehicle so long as he remains in his seat; but if the driver leaves the vehicle, the switch will remain closed. If the vehicle, while traveling along the streets, is blocked by traffic congestion, or at crossings, so that it must be stopped, it would be undesirable to allow the automatic devices above described to stop the engine. Hence, I arrange this switch adjacent the clutch lever 24 so that when the operator, upon being compelled to stop the vehicle by reason of traffic conditions, moves the clutch pedal to throw out the clutch and disconnect the engine, he will also interrupt the circuit through the heating coil of the thermostat, and the latter will not trip the switch in the ignition circuit. By bearing upon the clutch pedal, the operator may hold the thermostat circuit open as long as he desires; but in order to start the vehicle, he must allow the clutch pedal to return to its normal position, where it remains while the engine is driving the vehicle and this return of the clutch pedal permits the switch c to again close the thermostat circuit. If the operator, during an ordinary stop of the vehicle, at the roadside, should leave his seat, the switch c will remain closed, and if he fails to stop the engine, it will be automatically stopped by the tripping of the switch a.

In operation, if the operator moves the key switch a to its "on" position and does not start the engine, or if he stalls the engine and leaves the switch closed, the switch will be automatically opened after a brief delay. Or, if he closes the key switch and starts the engine, but does not start the vehicle, the motor will be automatically stopped. If he closes the switch, starts the engine and then starts the vehicle without unnecessary delay, the vehicle-controlled switch d will open the thermostat circuit and the thermostat will not trip the ignition circuit switch. When the vehicle is brought to a stop, the switch d will close the thermostat circuit and if the operator does not then stop the motor, within a predetermined time from the closure of the switch d, it will be automatically stopped by the action of the thermostat, unless the operator remains in his seat and holds the manually controlled switch c open.

In Fig. 3, the arrangement is the same as in Fig. 2, except that I have shown two thermostats which may be used alternately to lock the ignition switch in the "on" position, so that after one thermostat has become heated and has tripped the switch, the latter may be immediately thrown to the other "on" position and engaged by the other thermostat which, being at normal temperature, will lock the switch. In this figure, a' indicates the key controlled switch for closing the ignition and thermostat circuits, and this switch has two "on" positions and an intermediate "off" position. As shown in the drawing, the disk 25 carries the switch arm 26 which is held centrally between two sets of stationary contacts by centering springs 18$^a$. When the switch arm is swung to the right from the "off" position in which it is shown in the drawing, it engages the contacts 27 and 28 and is locked by a detent on the thermostat $b'$ which engages the arm, and when the arm is swung to the left of the "off" position, it engages the contacts 27$^a$ and 28$^a$ and is locked by a detent on the thermostat $b^2$. The contacts 28$^a$ are connected to the ignition circuit and when the switch arm engages either of these contacts, said circuit is closed. The contact 27 is connected to one end of coil 21$^b$ of the thermostat $b'$ and the contact 27$^a$ is connected to one end of coil 21$^c$ of thermostat $b^2$. The other ends of the coils are connected by conductor 21, through switches $c$ and $d$ to ground. In the right hand "on" position of the switch, the heating coil of thermostat $b'$ will be connected to the battery, and in the left hand "on" position, the coil of thermostat $b^2$ will be connected to the battery. With either thermostat in use, the apparatus functions the same as that illustrated in Fig. 2, but the provision of two thermostats enables the operator to throw the switch into engagement with one which is cool and which will hold the switch immediately after the other has become too warm to hold the switch. Thus, the possibility of delay in reclosing the switch and starting the engine is avoided. Preferably, the switch will be arranged so that in successive closures of the switch, the switch arm will necessarily engage the two sets of contacts alternately.

Figure 4:
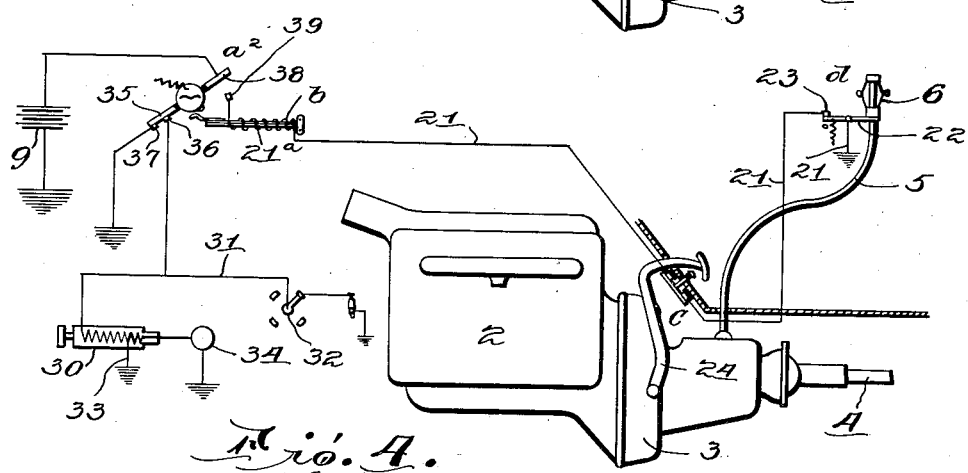
Fig. 4 is a diagrammatic view, showing the invention applied to an engine having a magneto ignition system, the hand operated switch for controlling the magneto circuit being also employed to control the thermostat circuit; and, Fig. 5 is a diagrammatic view showing the invention applied to a magneto ignition system, the circuit for the thermostat being controlled by the engine.

In Fig. 4, the invention is illustrated in connection with a magneto system, in which 30 indicates a magneto and 31 indicates the high tension side of the magneto circuit leading to a distributor 32 and thence to the spark plugs and ground. The ground connection of the magneto coils is indicated at 33, and 34 indicates the circuit breaker for the low tension coil of the magneto, the circuit breaker having a ground connection, as shown. For stopping the motor, the switch $a^2$ is provided with means for grounding the high tension side of the ignition circuit illustrated as a switch blade 35, adapted to bridge two insulated contacts 36 and 37, the former connected to the conductor 31 and the latter connected to ground, as shown. The disk is provided with an independent switch arm 38, adapted to engage a fixed contact 39 to close the thermostat circuit. The thermostat circuit is the same as in Fig. 1, from the battery through the switches $c$ and $d$ to ground, and thence to the other side of the battery. The operation is also the same as in Fig. 1, except that in the "off" position of the switch $a^2$, the ignition circuit is rendered inoperative by grounding the high tension conductor, in the customary way, while in the battery ignition system shown in Fig. 1, this circuit is rendered inoperative by interrupting it. In the "on" position of the switch $a^2$, the thermostat will heat and trip the switch in a short time unless the thermostat circuit is held open, by the operation of the vehicle, at the switch $d$, or by the operator at the switch $c$, and if the motor is allowed to idle while the operator is away from his seat in the vehicle, it will be automatically stopped.

Figure 5:
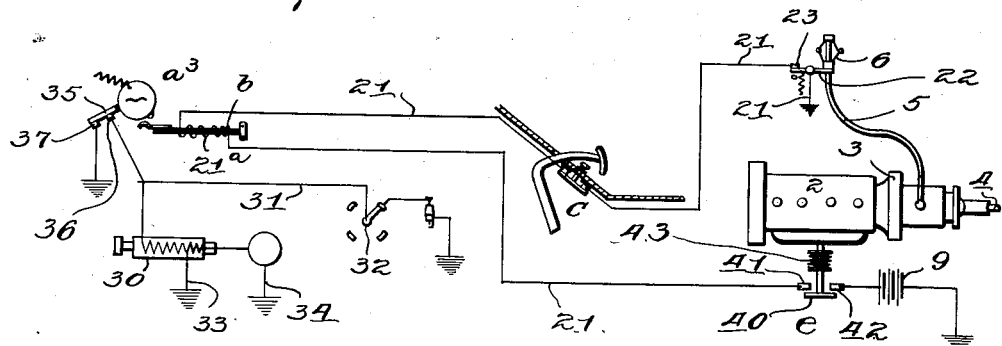

In the above described arrangements, the thermostat circuit and the ignition circuit are made operative simultaneously upon the closure of the key switch $a$, $a'$, or $a^2$, and hence the thermostat will operate to render the ignition circuit inoperative in a predetermined time, after the closure of said switch, if the switches $c$ and $d$ are closed, whether the engine is running or not. In Fig. 5, I have shown an arrangement which is a modification of the apparatus illustrated in my co-pending application, Serial No. 427,730, in which the thermostat circuit is not made operative until the engine is cranked to start it, and with this arrangement the ignition circuit is not made inoperative by the thermostat until a predetermined time after the engine starts. This arrangement may be applied to battery ignition systems, but for the purpose of illustration, I have shown it in connection with a magneto ignition system. The magneto and its circuits are the same as in Fig. 4, and the parts are similarly numbered, including the switch blade and the contacts on the switch $a^3$. In Fig. 5, the thermostat circuit is not opened and closed by the switch $a^3$, as that is unnecessary, but it is opened and closed by a normally open vacuum-controlled switch $e$, which is moved to closed position by the suction of the engine when the latter is cranked to start it, and which remains closed as long as the engine is running. This switch comprises a normally expanded bellows 43, connected to the intake pipe of the engine, which bellows collapses and moves a metal bridge-piece 40 into engagement with fixed contacts 41 and 42, when a partial vacuum is created in the bellows by the cranking of the engine. This closes the thermostat circuit 21, and if the switches $c$ and $d$ remain closed, the thermostat will trip the switch $a^3$ in a predetermined time after the closure of the switch $e$. If a battery ignition system is used, the switch $a^3$ would be arranged as in Fig. 1, to interrupt the ignition circuit when the switch is tripped. With the magneto ignition system shown, the tripping of the switch $a^3$ causes the high tension wire of the system to be grounded, thus short-circuiting the magneto and causing the engine to stop. When the engine stops, the vacuum in the bellows is relieved and the switch *e* opens automatically, thus interrupting the thermostat circuit. The action of the switch *d*, to prevent the tripping of the switch $a^3$, while the vehicle is running, and of the switch *c* to prevent the tripping of the switch $a^3$, while the vehicle is stopped by traffic conditions is the same as in the previously described figures.

What I claim is:

1. The combination with a motor vehicle having an internal combustion engine, an ignition circuit therefor, and a switch for rendering said circuit operative or inoperative at will, of a thermostat adapted, when heated, to cause said circuit to become inoperative, a circuit for the thermostat, independent of the ignition circuit, and means for rendering said thermostat circuit inoperative when the vehicle starts and operative when the vehicle stops.

2. The combination with a motor vehicle having an internal combustion engine, an ignition circuit therefor, and a switch for rendering said circuit operative or inoperative at will, of a thermostat adapted, when heated, to cause said circuit to become inoperative, a circuit for the thermostat, independent of the ignition circuit, means for rendering said thermostat circuit inoperative when the vehicle starts and operative when the vehicle stops, and means convenient to the driver's seat of the vehicle for rendering the thermostat circuit inoperative at will while the engine is running and the vehicle is stopped.

3. The combination with a motor vehicle having an internal combustion engine, an ignition circuit therefor, and a switch for rendering said circuit operative or inoperative at will, of a thermostat adapted, when heated, to cause said circuit to become inoperative, a circuit for the thermostat, independent of the ignition circuit, means for rendering said thermostat circuit inoperative when the vehicle starts and operative when the vehicle stops, and a normally closed switch in the thermostat circuit associated with the clutch lever of the vehicle and adapted to be opened when the clutch lever is moved to disengage the clutch.

4. The combination with a motor vehicle having an internal combustion engine, an ignition circuit therefor and a switch for rendering said circuit operative or inoperative at will, of a thermostat for causing the actuation of said switch to its off position, a circuit for the thermostat, independent of the ignition circuit, adapted to be closed by said switch when the latter is moved to its on position, and means for holding the thermostat circuit open while the vehicle is running.

5. The combination with a motor vehicle having an internal combustion engine, an ignition circuit therefor and a switch for closing said circuit, of means for opening said circuit in a predetermined time after its closure comprising a thermostat, a circuit for the thermostat, independent of the ignition circuit, controlled by said switch and means for rendering said thermostat circuit inoperative when the vehicle starts and operative when the vehicle stops.

6. The combination with a motor vehicle having an internal combustion engine, an ignition circuit therefor and a switch for closing said circuit, of means for opening said circuit in a predetermined time after its closure comprising a thermostat, a circuit for the thermostat, independent of the ignition circuit, adapted to be closed by said switch, and a normally closed switch in the thermostat circuit controlled by a part on the vehicle to open when the vehicle starts and to close when the vehicle stops.

7. The combination with a motor vehicle having an internal combustion engine, an ignition circuit therefor and a switch for closing said circuit, of means for opening said circuit in a predetermined time after its closure comprising a thermostat, a circuit for the thermostat, independent of the ignition circuit, adapted to be closed by said switch, and two normally closed switches in the thermostat circuit, one adapted to be manually opened and the other controlled by a part on the vehicle to open when the vehicle starts and to close when the vehicle stops.

8. The combination with a motor vehicle having an internal combustion engine, an ignition circuit therefor and a switch for rendering said circuit operative or inoperative at will, said switch having a plurality of on positions, of a plurality of thermostats for causing the actuation of said switch to its off position, a circuit for the thermostats, independent of the ignition circuit, means associated with said switch for connecting the heating elements of said thermostats separately in the thermostat circuit in the different on positions of said switch, and means for holding the thermostat circuit open while the vehicle is running.

9. The combination with a motor vehicle having an internal combustion engine, an ignition circuit therefor and a switch for rendering said circuit operative or inoperative at will, of a thermostat for causing the actuation of said switch to its off position, a circuit for the thermostat, independent of the ignition circuit, means controlled by the engine for closing said thermostat circuit when the engine starts, and means controlled by a part on the vehicle for opening the thermostat circuit when the vehicle starts and closing it when the vehicle stops.

In testimony whereof I affix my signature.

ROBERT WATSON.